(12) United States Patent
Anschutz et al.

(10) Patent No.: US 8,314,691 B2
(45) Date of Patent: Nov. 20, 2012

(54) ASSISTIVE DRIVING AID

(75) Inventors: John Robert Anschutz, Conyers, GA (US); Michele Veronica Luther-Krug, Peachtree City, GA (US); Ronald Thomas Seel, Smyrna, GA (US); Michael Lawrence Jones, Marietta, GA (US)

(73) Assignee: Shepherd Center, Inc., Atlanta, GA (US)

( * ) Notice: Subject to any disclaimer, the term of this patent is extended or adjusted under 35 U.S.C. 154(b) by 492 days.

(21) Appl. No.: 12/685,742

(22) Filed: Jan. 12, 2010

(65) Prior Publication Data

US 2011/0169624 A1 Jul. 14, 2011

(51) Int. Cl.
*B60Q 1/00* (2006.01)
(52) U.S. Cl. ......... 340/439; 340/441; 340/457; 340/903
(58) Field of Classification Search .................. 340/439, 340/441, 903, 440, 457, 905, 573.1, 522; 701/207, 208
See application file for complete search history.

(56) References Cited

U.S. PATENT DOCUMENTS

| | | | |
|---|---|---|---|
| 2004/0257212 A1* | 12/2004 | Wang | 340/441 |
| 2005/0285756 A1* | 12/2005 | Shwak | 340/903 |
| 2006/0187012 A1* | 8/2006 | Haskew | 340/440 |
| 2009/0207012 A1* | 8/2009 | Ponziani | 340/457 |
| 2009/0237230 A1* | 9/2009 | Ponziani | 340/457 |
| 2009/0243883 A1* | 10/2009 | Simon | 340/905 |
| 2009/0284361 A1* | 11/2009 | Boddie et al. | 340/439 |
| 2010/0026476 A1* | 2/2010 | Yamaoka et al. | 340/439 |
| 2010/0063725 A1* | 3/2010 | Miura et al. | 701/207 |
| 2010/0123588 A1* | 5/2010 | Cruz Hernandez | 340/573.1 |
| 2011/0115617 A1* | 5/2011 | Bennett | 340/439 |
| 2012/0001749 A1* | 1/2012 | Cruz-Hernandez | 340/522 |

* cited by examiner

*Primary Examiner* — Hoi Lau
(74) *Attorney, Agent, or Firm* — Thomas|Horstemeyer, LLP (57) ABSTRACT

One embodiment of such a method of assisting a driver of a vehicle comprises receiving a command from the driver attesting that the driver has performed one of a plurality of driving requisites; in response to receipt of the command, presenting an audible cue commending the driver for performing one of the plurality of driving requisites; tracking an amount of time that elapses before the command attesting to performance of a respective driving requisite is received; and in response to the amount of time exceeding a threshold for the respective driving requisite, presenting an audible cue intending to remind the driver about the respective driving requisite being tracked that has exceeded the respective threshold.

20 Claims, 7 Drawing Sheets

ASSISTIVE DRIVING AID

TECHNICAL FIELD

The present disclosure is generally related to electronic devices and, more particularly is related to an electronic driving aid for a vehicle.

BACKGROUND

A potential obstacle to driving a vehicle occurs when a driver of the vehicle has a problem with maintaining focus or concentration while driving. For example, consider a scenario where a person is injured in an automobile accident and as a result of the accident, executive functioning, attention/concentration, processing speed, visual episodic memory, and/or psychomotor functioning of the driver is impaired. While the driver is impaired, attempts to drive a vehicle may result in traffic violations, including speeding and following too close to a motor vehicle, or possible accidents due to the disruption in the driver's focus and concentration. Other possible impairments include, but are not limited to, brain injury, stroke, Parkinson's disease, attention deficit disorder (ADD), normal aging, etc. Further, persons with no diagnosable condition but beset with receiving multiple traffic violations can benefit from improved concentration and focus.

SUMMARY

Embodiments of the present disclosure provide a method of assisting a driver of a vehicle. One embodiment of such a method comprises receiving a command from the driver attesting that the driver has performed one of a plurality of driving requisites; in response to receipt of the command, presenting an audible cue commending the driver for performing one of the plurality of driving requisites; tracking an amount of time that elapses before the command attesting to performance of a respective driving requisite is received; and in response to the amount of time exceeding a threshold for the respective driving requisite, presenting an audible cue intending to remind the driver about the respective driving requisite being tracked that has exceeded the respective threshold.

Embodiments also provide a system of assisting a driver of a vehicle comprising a microprocessor configured to: receive a command from the driver attesting that the driver has performed one of a plurality of driving requisites; in response to receipt of the command, present an audible cue commending the driver for performing one of the plurality of driving requisites; track an amount of time that elapses before the command attesting to performance of a respective driving requisite is received; and in response to the amount of time exceeding a threshold for the respective driving requisite, present an audible cue intending to remind the driver about the respective driving requisite being tracked that has exceeded the respective threshold. The system further comprises a memory storage device for storing one or more of the audible cues for the driver.

Other systems, methods, devices, features, and advantages of the present disclosure will be or become apparent to one with skill in the art upon examination of the following drawings and detailed description. It is intended that all such additional systems, methods, devices, features, and advantages be included within this description and select embodiments of which be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
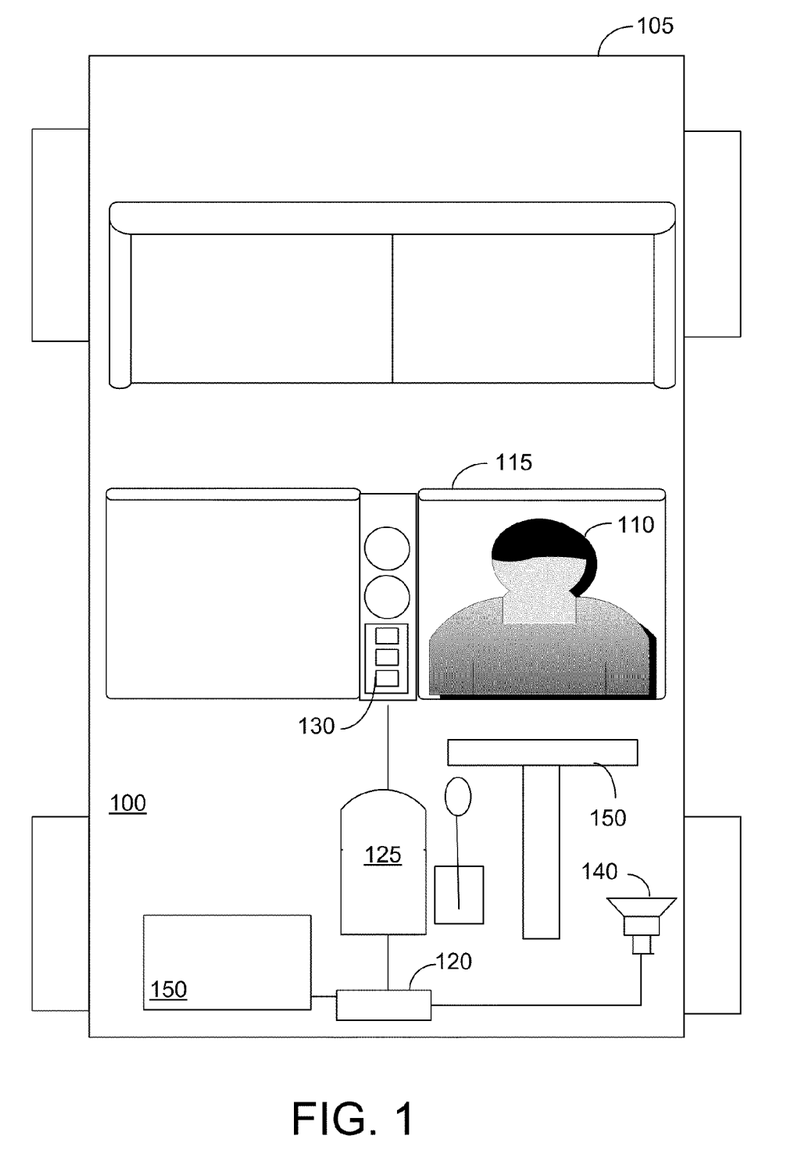
FIGS. 1-2 are exemplary diagrams of embodiments of a vehicle assistive system 100 in accordance with the present disclosure.

FIG. 1 is an exemplary diagram of one embodiment of a vehicle assistive system 100 in accordance with the present disclosure. In FIG. 1, an interior representation of an exemplary vehicle 105 is shown where a driver 110 or operator is seated in the driver's seat 115 of the vehicle. In this particular embodiment, a control unit 120 of the vehicle assistive system 100 is positioned under or behind a console 125 of the vehicle so that the control unit 120 is hidden from view. In other implementations, the control unit 120 may be positioned elsewhere such as in a trunk of the vehicle, as a non-limiting example. The control unit 120 is connected or coupled (e.g., via a cable, wireless communications, etc.) to an input pad 130, such as a key pad, button pad, or touch screen display, that is within reach of the driver 110 (e.g., such as being positioned near the driver's seat 115, on a steering wheel 150, etc.) and is preferably not distracting to the driver. The input pad 130 (or touch screen) has keys or buttons primarily used for tactile input. In one embodiment, the control unit 120 is connected or coupled to a speaker assembly 140 that provides audible communications to the driver 110 (e.g., via a cable, wireless communications, etc.).

The control unit 120 in one embodiment is connected to the vehicle's battery 150 in order to receive power. For example, the control unit 120 may provide a connector which may be inserted into the vehicle's cigarette lighter receptacle to receive power from the battery 150. Alternatively, the control unit 120 may have its own power source separate from the vehicle 105, such as a battery pack, or alternatively, the control unit 120 may be hardwired to the vehicle battery 150. For example, battery power may be available by accessing the vehicle's onboard diagnostic (OBD) system and/or controller area network (CAN) bus.

Figure 2:
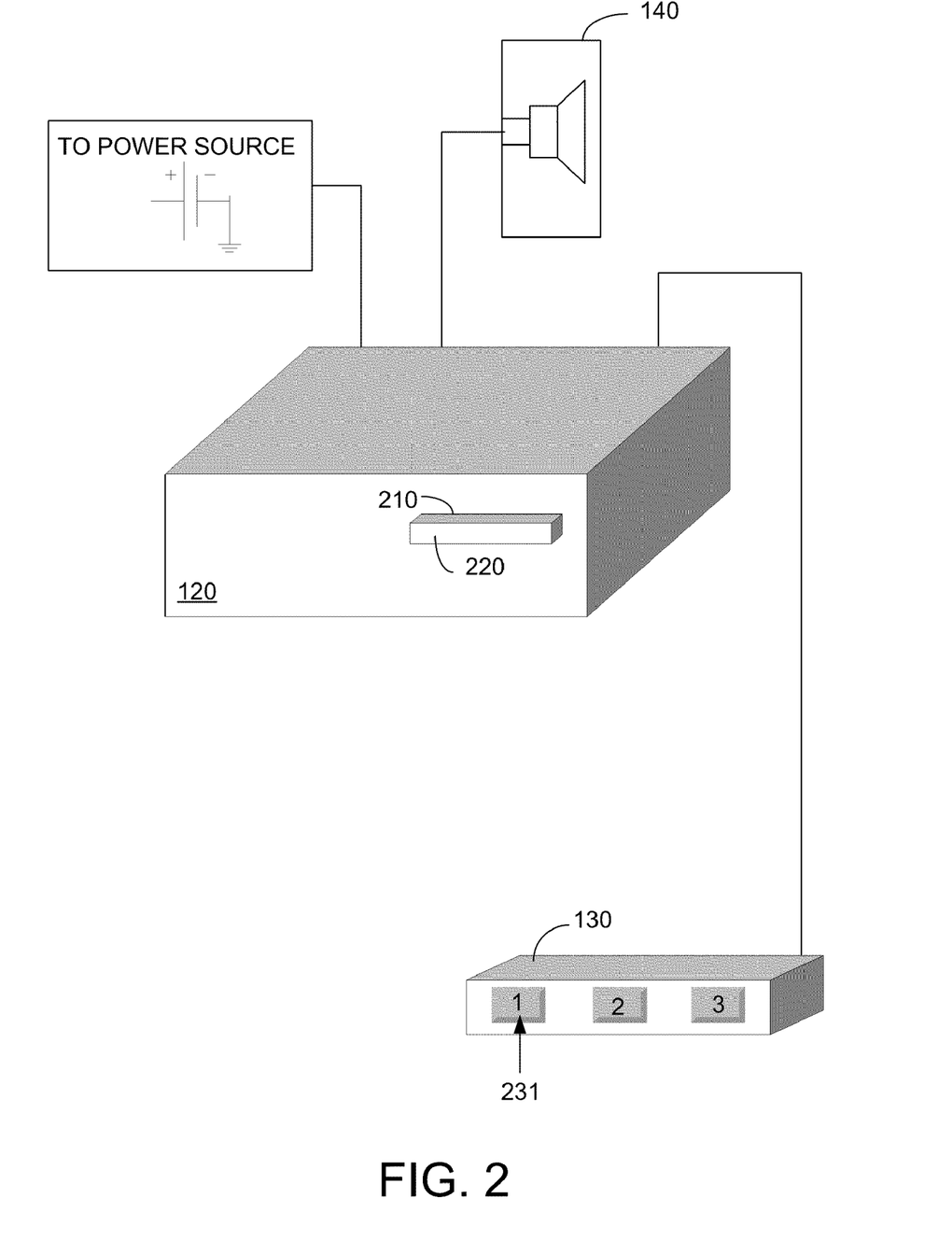

One embodiment of the control unit 120 features a port 210 where a memory data storage device 220, such as a memory card or flash drive, may be inserted, as represented in FIG. 2. The memory data storage device 220 may store electronic files containing audible cues to be provided to the driver in one embodiment as a driving aid to help elicit or encourage a desired driving behavior.

The audible cues may also be customized for a particular driver, such that a memory data storage device 220 may be replaced with or swapped out with another memory data storage device when a new driver or operator is set to drive the vehicle 105. The memory data storage device 220 may also contain software code corresponding to operation of the control unit 120 and/or buttons or keys on the input pad 130.

For example, a first button 231 on the input pad 130 for a first driver may correspond to functionality involving attesting to checking the vehicle's speed and related audible cues provided by the vehicle assistive system 100, whereas the first button 231 on the input pad 130 for a second driver may correspond to functionality involving attesting to proper lane control and related audible cues, since the second driver may not have a problem with speed control but does have a problem with lane control (e.g., maintaining a vehicle safely in one lane of a road). Accordingly, operation of an embodiment of the vehicle assistive system 100 may be customized based on driver characteristics and changed by inserting a different memory data storage device 220 into the control unit 120, in one embodiment.

In the case of the button or key pad 130, the button pad 130 transmits signals to the control unit 120 based upon which buttons or keys of the pad 130 are pressed or inputted. In accordance, with one embodiment, a driver of the vehicle pushes or selects a button to attest or to indicate that the driver has performed a particular driving requisite. A driving requisite is generally a particular action that is deemed to be important for good driving practice. For example, in the illustrations above, a driver may check vehicle speed and then press a first button 231 of the pad 130 to attest that the driver has checked to make sure the vehicle's speed is at a proper and safe level. Therefore, checking for proper and safe vehicle speed is one possible driving requisite that may be programmed or configured into operation of a vehicle assistive device 100. Accordingly, the pad 130 relays to the control unit 120 that the first button 231 has been pressed or activated. The control unit 130 receives the transmission or signal and interprets the activation of the first button as an attestation that the driver has checked for proper vehicle speed, in this particular non-limiting example. The control unit 130 may then in response to receipt of the command or signal, provide an audible cue that positively reinforces the driver or encourages driving behavior in line with the driving requisite that the driver generated the command. For example, through the speaker assembly 140, the control unit 120 may transmit an audio message saying "Great job with checking your speed." The other button or other buttons on the input pad 130 may perform in a similar manner for other driving requisites, such as those involving verifying the checking a vehicle's mirrors for approaching or closely situated vehicles, proper lane positioning, space management, avoiding fixed stares or staring, etc. which, if not performed, may lead to a higher risk of vehicle accidents or traffic violations.

One embodiment of the vehicle assistive system 100 also audibly announces audible cues to the driver when the driver has failed to press or activate one of the buttons on the input pad 130 which indicates that the driver has failed to perform one of the driving requisites which is deemed to be part of good driving practice. Therefore, the announced audible cue may remind the driver of the merits of performing driving requisites, in general, or the specific driving requisite which has not been detected to have been verified as being performed by the driver. It is noted that messages played or activated by the control unit 120 may be played one time or may be configured to repeat if not acknowledged by the driver, where acknowledgment may be signaled by pressing or selecting a button or button sequence from the input pad 130.

In one embodiment, a driver 110 of the vehicle 105 may select volume levels for the audible cues played by the control unit 120 that are preferred by the driver. The volume controls may be located on the control unit 120 in one embodiment or possibly on the input pad 130.

Referring back to FIG. 2, the memory data storage device 220 is available to be connected (e.g., inserted into the control unit 120, accepted by the control unit 120, detected to be within range of the device, etc.) to the control unit 120, in one embodiment. For example, FIG. 2 shows a physical memory data storage device 220 being inserted into a port or interface connection located on the front of a control unit 120. In an alternative embodiment, the memory data storage device 220 and port 210 may be located on another system component, such as the input pad 130 which may be more easily accessible by the driver 105 depending on the respective positioning of the input pad 130 and control unit 120. Positioning of the input pad 130 is preferably done so that a driver is not distracted interfacing with the pad 130, especially when improving the driver's concentration and focus may be the goal or purpose of using the vehicle assistive system 100. Additional communication devices or components may be included in the system between the devices or components shown in the figures.

In one embodiment, a way to control information provided on and operations provided by the vehicle assistive system is to store the information and pertinent software on the memory data storage device 220 itself. For example, the memory data storage device 220 may constitute a thumb drive, a flash card, or a secure digital media card, among others, that is easily unpluggable from the control unit (or other device component) and capable of storing digital files and content.

Figure 3:
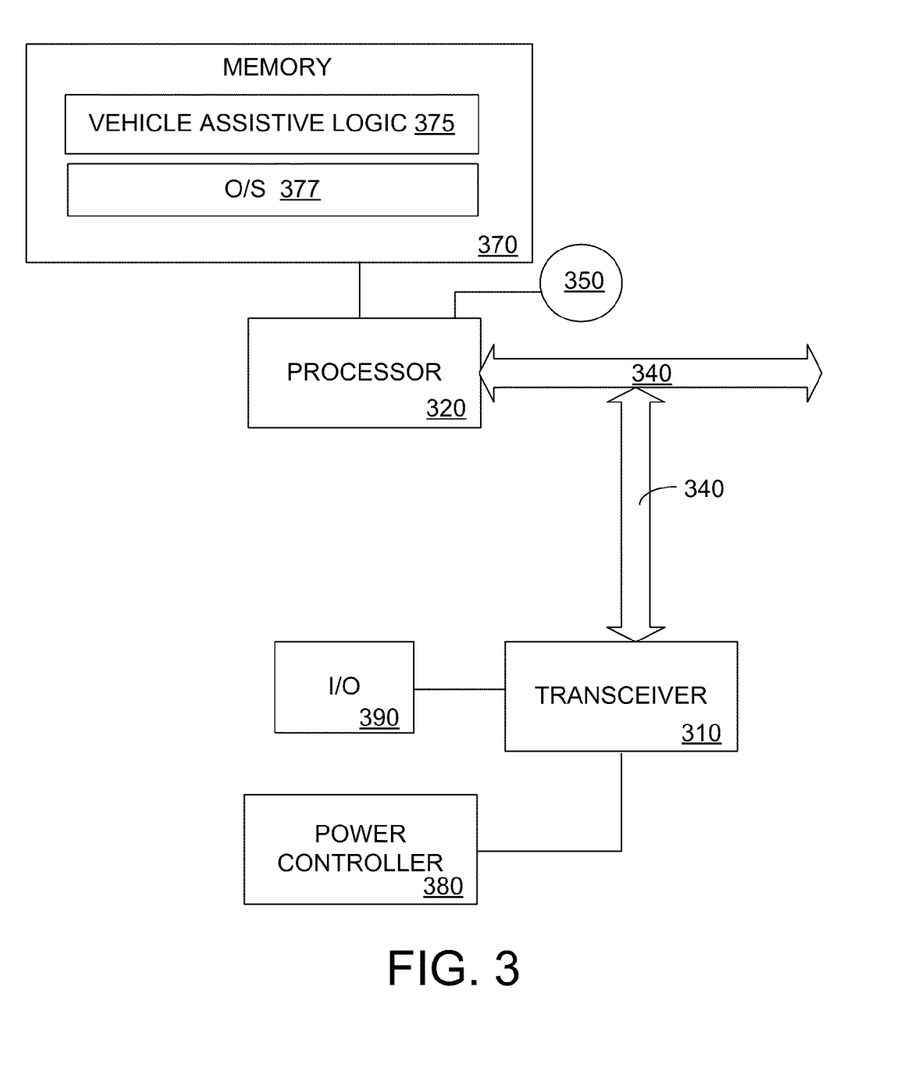
FIG. 3 is a block diagram of an embodiment of a control unit in accordance with FIGS. 1-2.

Embodiments of the memory data storage device 220 include memory that may include one or more of the following: ROM (Read Only Memory), EEPROM (Electrically Erasable Programmable ROM), and RAM (Random Access Memory). The ROM and/or EEPROM generally include software, which is executed by microprocessor 320.

While the foregoing embodiments show a physical memory data storage device 220 being inserted or plugged into a control unit 120 (or other system component), embodiments of the present disclosure are not limited to the foregoing examples. For example, utilizing near-field communication technology, a physical memory data storage device 220 may be detected by the control unit, as a non-limiting example, within a certain range of the control unit, in some embodiments. As long as the control unit 120 remains in range of the physical memory data storage device 220 and vice versa, the control unit 120 can read information maintained on the memory data storage device 220.

The structure of a physical memory data storage device 220, in one embodiment, includes a housing having upper, lower, and side walls forming a generally rectangular cross-section defining an elongated chamber having a front end opening. A plug connector is mounted at a front end of the housing and is part of a substrate for circuitry that is housed inside the memory data storage device 220. Inside the elongated chamber, circuitry having a memory portion is located to store information, such as audible cues and code corresponding to the buttons on the input pad 130 and operations performed by the control unit 120. The plug connector is electrically connected to the circuitry through contacts and conductive traces that are formed on the circuitry, such as printed circuit board, using known techniques. Additionally, information may be stored locally or internally on the vehicle assistive system 100 in addition to information stored on the removable memory data storage device 220.

The electronic components for one embodiment of a vehicle assistive system are illustrated in FIG. 3. This electronics package generally includes a microprocessor 320 connected by a data bus 340. A power controller 380 controls power to the electronics. In some embodiments, a transceiver 310 may be included which can read and/or interrogate a physical memory data storage device 220.

The microprocessor 320 controls the basic functions of the vehicle assistive system 100 such as providing power up or power down and executing stored applications or software in memory 370.

The software in memory 370, whether internal or external, such as from a removable memory data storage device 220, may include one or more separate programs, each of which includes an ordered listing of executable instructions for implementing logical functions. In the example of FIG. 3, the software in the memory 370 includes a vehicle assistive logic 375 for implementing a process similar to that depicted in flow charts of FIGS. 5-7 and a suitable local operating system (O/S) 377. The operating system 377 controls the execution of other computer programs and provides scheduling, input-output control, file and data management, memory management, and communication control and related services.

The vehicle assistive logic 375 is a source program, executable program (object code), script, or any other entity comprising a set of instructions to be performed. When a source program, the program needs to be translated via a compiler, assembler, interpreter, or the like, which may or may not be included within the memory 370, so as to operate properly in connection with the O/S 377. Furthermore, the vehicle assistive logic 375 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The transceiver 310 transmits and receives communications. The transceiver 310 is coupled to input/output (I/O) devices or controls 390, such as an input pad 130 or speaker 140 that is configured to convert received transmissions into audible sound. Input controls (e.g., via buttons or switches that allow for user input) send a signal when pressed or activated to the microprocessor 320. Input controls may also comprise an incorporate well-known touch-screen circuitry (not shown), to replace or in addition to input pad assembly 130. With this circuitry, the user can interact with microprocessor 320, e.g., using a finger or a stylus to touch the surface of a touch screen display, which is tactile-sensitive. Microprocessor 320 receives from the touch screen circuitry a signal identifying the location on the display where it has been touched. If such a location matches the predetermined location of one of displayed options or icons, microprocessor 320 determines that the option or icon has been selected, such as a representation corresponding to "button 1."

Further, in one embodiment, the control unit 120 may include voice recognition circuitry which allows a user (e.g., driver) to give voice commands (e.g., "I have checked my speed") to the control unit 120 as a substitute for pressing keys on the input pad 130 to attest to performance of a driving requisite, such as checking for vehicle speed. For example, use of a one-button or multiple button input pad could be distracting for some drivers and may take the driver's attention from the road he or she is traveling, so that a no-button voice recognition system may be a preferred form of interface with the vehicle assistive driving system 100. It is understood that the types of audible cues and driving requisite input options placed on the vehicle assistive system 100 is a matter of configuring the appropriate code and settings.

The vehicle assistive logic 375 which includes an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the present disclosure includes embodying the functionality of embodiments of the present disclosure in logic embodied in hardware or software-configured mediums.

In an alternative embodiment, where the vehicle assistive logic 375 is implemented in hardware, the vehicle assistive logic 375 can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 4:
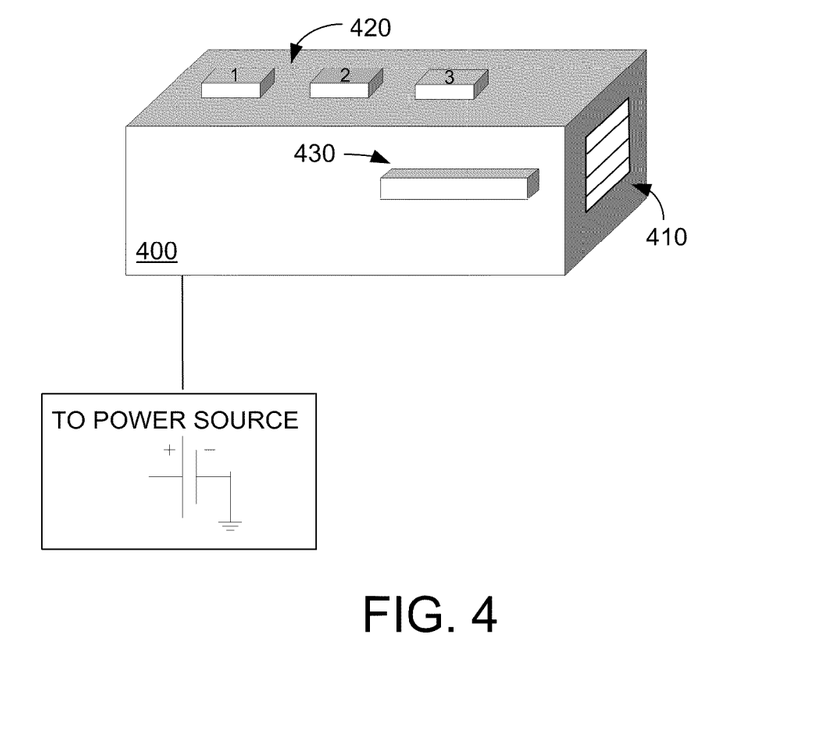
FIG. 4 is a diagram of representation of an embodiment of the vehicle assistive system as a single unit in accordance with the present disclosure.

Referring now to FIG. 4, there is shown one embodiment of the vehicle assistive system 400 which is a single unit, as opposed to including multiple components. Here, the speaker assembly (contained inside an enclosure where an opening 410 allows for sounds from the speaker to travel), input pad 420, and memory digital data storage port 430 are part of or integral to the same assembly as the control unit components. Therefore, the single unit 400 may be easily removed from a vehicle and could be considered portable and easily transportable from one vehicle to the next. For example, the driver may place the single unit on a dash, passenger seat, console, in the vehicle where it may be easily pluggable into the vehicle's power source (e.g., via cigarette lighter receptacle) and easily heard when in operation.

Also, in one embodiment, audible cues or messages from the control unit 130 may be provided over a vehicle's sound system which also provides music, radio broadcasts, etc. In one implementation, a switch may be installed in the vehicle which mutes sound from a radio console when audible transmissions are detected from the control unit so that the radio broadcast is momentarily interrupted while the audible transmissions from the control unit is played. Alternatively, the vehicle's sound system may have an auxiliary port in which audible communications transmitted by the control unit 120 may be fed.

Now, consider a scenario where a driver has been assessed and determined to be experiencing problems with a) Lane positioning; b) Space management; c) Use of mirrors; d) Speed control; and e) Fixed stare with no conversation or 'arousal', as non-limiting examples. An embodiment of the vehicle assistive system 100 may be configured to help provide positive reinforcement audio cues for these behaviors to the driver during a driving session. For example, in one implementation, the vehicle assistive system 100 provides a positive cue when the user presses a button on an input pad 130 after checking: mirrors, speed, or space. The system 100 also provides a reminder of good driving technique if the button has not been pressed after a set period of time, such as 2 minutes.

The following are exemplary cues that may be played by the control unit 120 which are related to the regulation of vehicle speed:

Great job with checking your speed;
Good job with speed control;
Nice job catching the speed limit signs;
Awesome job checking your speed;
Great handling of your speed awareness;
Oh Yes. You are doing great about knowing your speed;
Sometimes speed limit signs are tricky to spot but you are doing great;
You should be proud about knowing how fast you should be driving;
You are awesome in doing everything you can to maintain a safe speed; and
Perfect. I commend you on your speed control.

The following are exemplary cues that may be played by the control unit 120 which are related to the regulation of checking vehicle mirrors:

Great job with checking your mirrors;
Good job with your mirrors;
Nice job catching potential hazards with your mirrors;
Awesome job checking your mirrors;
Great handling of your mirror checks;
Oh Yes! You are doing great in checking your mirrors;
Sometimes cars can hide in your blind spot but you won't be surprised because you are doing a great job in checking your mirrors often;
You should be proud about how well you are checking your mirrors; and
You are awesome in doing everything you can to know what is around you.

The following are exemplary cues that may be played by the control unit 120 which are related to the regulation of keeping adequate space between the vehicle and its surroundings:

Great job with watching the space between you and the cars around you;
Good job being aware of the space around you to maintain a safe distance;
Nice job staying away from the car in front of you;
Awesome job checking on your space;
Great job with checking your following distance;
Oh Yes. You are doing great about not tailgating;
Sometimes the cars in front drive so slow and you are doing great to slow down and give them space;
You should be proud about knowing how to maintain a safe distance from the car in front of you;
You are awesome in doing everything you can to maintain a safe distance; and
Perfect. You are making sure not to follow too closely.

The following is one of the exemplary cues that may be played by the control unit 120 which reminds the driver to practice good driving habits after the control unit 120 has detected that the driver has not attested to any of the driving requisites within a designated period of time:

You are great driver. Remember to keep checking for proper speed, mirrors and space management It is noted that the foregoing examples are illustrative and not meant to be limiting. In one embodiment, the control unit 120 may also periodically play audible messages reinforcing good driving habits which is not responsive to whether the driver has recently or not recently attested to one of the driving requisites, such as:

You do some awesome driving when you use two hands on the wheel;
Being steady in you lane helps you to be safe. You do it best when you use two hands on the wheel;
You do a great job when you use two hands on the wheel; and
Remember to use turn signals to help other drivers know what you want to do. Using your turn signals helps to keep things safe.

Additional habits and/or driving objectives that may be incorporated into operations of the vehicle assistive system 100 include steering smoothly at all times; accelerating smoothly; stopping the vehicle gently; start braking well ahead of where the driver must stop to avoid sudden "jerks"; making sure your vehicle is in the correct gear; adjusting for existing weather, road, and other traffic conditions; remember to turn on lights if needed; obey traffic signals and signs at all times; signaling for all lane changes and turns; always looking for potential hazards; always looking over the proper shoulder before making lane changes or pulling away from the curb; anticipating another driver's errors and driving defensively; keeping eyes "moving", etc.

Therefore, with aid of the vehicle assistive system 100, a driver, who may be experiencing impairment of executive functioning, attention/concentration, processing speed, visual episodic memory, and/or psychomotor functioning can possibly return to independent driving.

Figure 5:
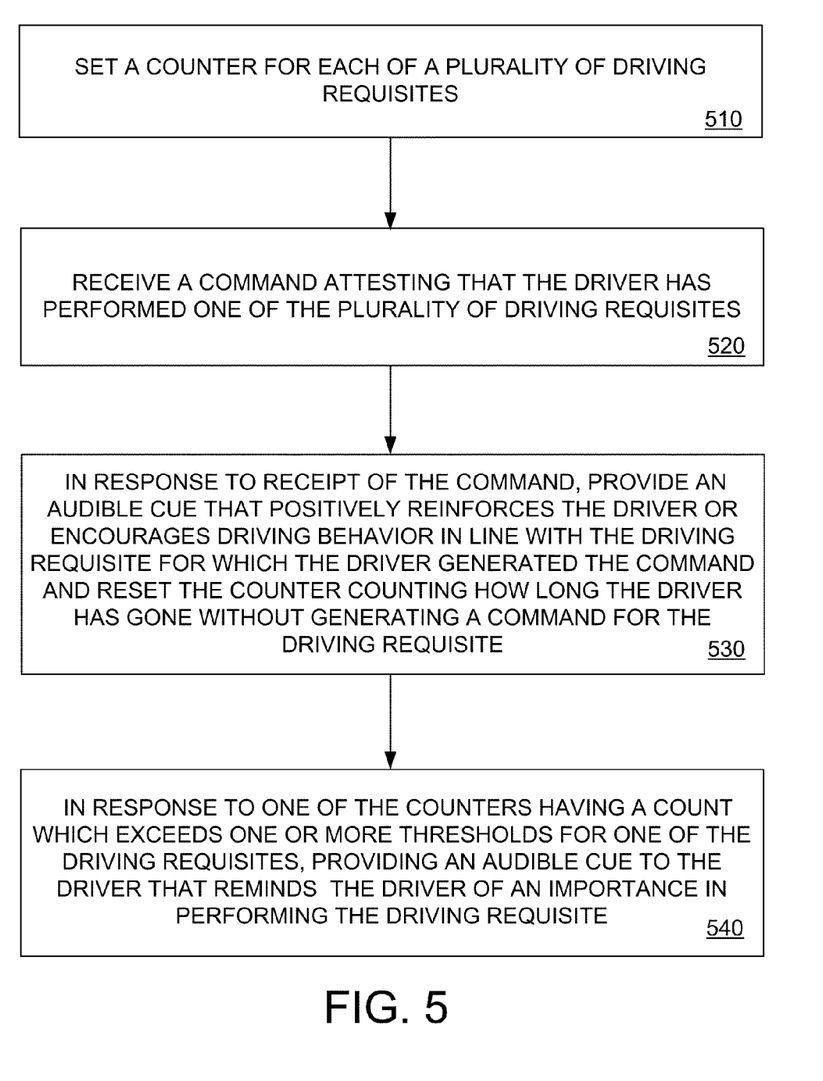
FIGS. 5-7 are flow chart diagrams depicting functionalities and operations of embodiments of the vehicle assistive system of FIG. 1.

Referring now to FIG. 5, a flow chart describing one embodiment of a method of assisting a driver of a vehicle is shown in accordance with the present disclosure. The steps shown in the flow chart diagram may be performed using a processor hardware device, such as microprocessor 320 in FIG. 3. In block 510, a counter for each of a plurality of driving requisites is set or started which counts how long the driver of a vehicle has gone without generating a command for attesting to performance of a respective driving requisite. The command is received (block 520) from an input control or interface (e.g., input pad 130) of the driver attesting that the driver has performed one of the plurality of driving requisites. In response to receipt of the command, the processor 320 of the control unit 130 provides (block 530) an audible cue that positively reinforces the driver or encourages driving behavior in line with the driving requisite for which the driver generated the command. The processor 320 also resets the counter counting how long the driver has gone without generating a command for the driving requisite. In response to the timer having a count which exceeds one or more thresholds for one of the driving requisites, the processor 320 provides (block 540) an audible cue to the driver that reminds the driver of an importance in performing the driving requisite or objective.

Threshold values and message contents or tones (e.g., excited, calm, stern, etc.) may be specific to and customized for a driver or operator by assigning a particular driver a particular memory data storage device 220 to use with the vehicle assistive system 100. As such, message content and presentations may be configured to appeal to a driver based on age, experience or other criteria of the driver, such as whatever driving tasks with which a driver may be struggling. Also, the messages may be configured to be in the audible or spoken language of the driver.

In one implementation, possible driving requisites comprise checking vehicle speed; checking vehicle mirrors; and checking vehicle spacing with respect to other vehicles. It is noted that audible cues customized for a first driver and stored on a removable memory data storage device 220 may be replaced with audible cues customized for a second driver and stored on a different removable memory data storage device 220. Commands representing the driver's attestation to performance of driving requisites may be generated using an input pad 130 positioned on a console of the vehicle 105, in one embodiment. Further, commands may be generated using an input pad positioned on a steering wheel 150 of the vehicle or possibly generated using an input pad positioned on a seat 115 of the vehicle. Audible cues, in some embodiments, are customized based on a spoken language (e.g., Spanish) of the driver; based on a level of physical impairment of the driver, and/or based on a level of driving experience of the driver. In some embodiments, audible cues are provided over a vehicle's sound system from the control unit 120. As such, presentation of audible cues causes the vehicle sound system to be muted. Whereas, in other embodiments, audible cues are provided over a speaker assembly 140 which is separate from the vehicle's sound system.

Figure 6:
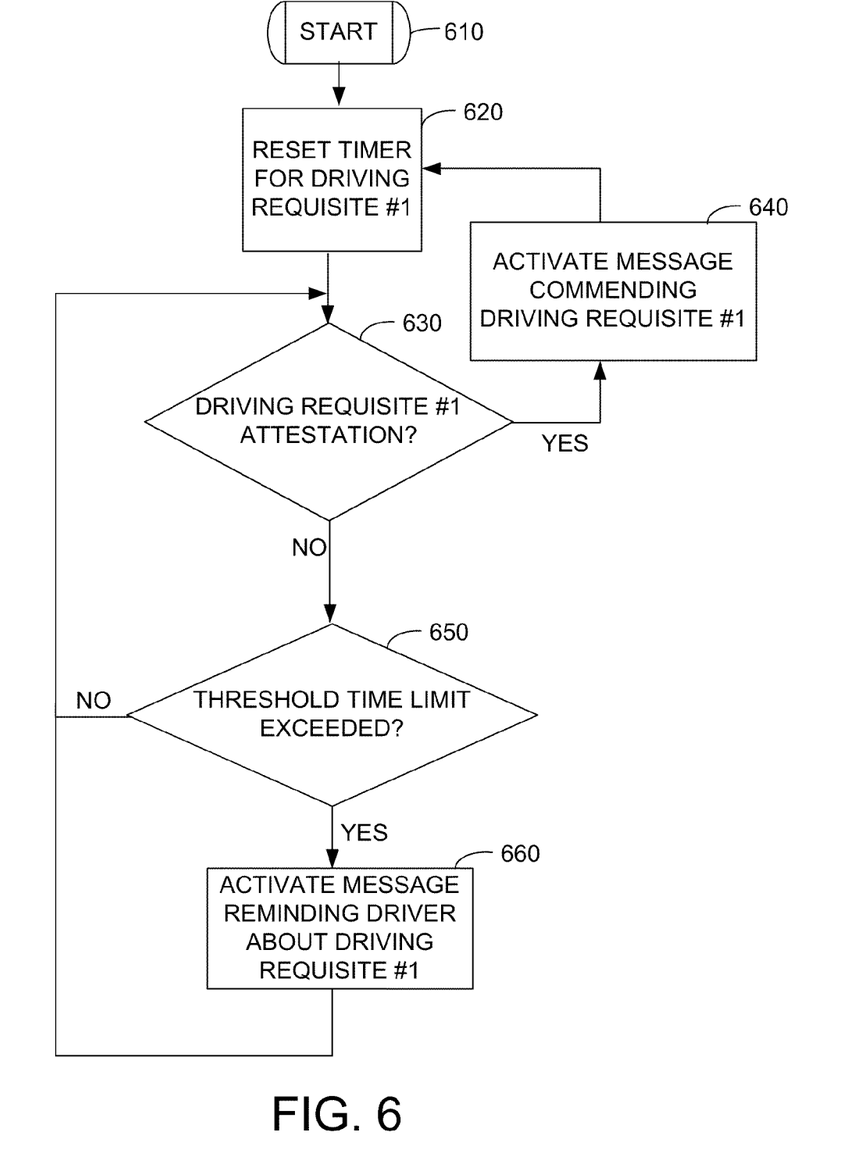

Referring now to FIG. 6, a flow chart is shown describing functionality of one embodiment of a vehicle assistive system 100. After initial startup (block 610), a timer or counter for a driving requisite (driving requisite #1) is set or reset (block 620) by a processor 320. The timer counts an amount of time that has expired since the timer was reset. The processor 320 determines (block 630) whether attestation of performance of driver requisite #1 (e.g., checking speed of vehicle) has been received. When the attestation is received, the processor 320 activates (block 640) a message (e.g., an audible message) commending the driver of a vehicle for performing driving requisite #1. The processor 320 then resets (block 620) the timer corresponding to the driving requisite #1.

When the attestation has not been received, the processor 320 determines (block 650) whether a threshold value for the driving requisite has been reached by the timer. For example, the threshold may be set at 5 minutes, such that the driver is to attest that he or she has checked his/her speed at least every 5 minutes. If 5 minutes passes and a command has not been received indicating that the driver has attested to performance of the desired requisite (e.g., checking vehicle speed), then the threshold is met or reached by the timer. When the threshold is reached, the processor 320 activates (block 660) a message (e.g., an audible message) reminding the driver to perform driving requisite #1. Otherwise, if the threshold is not reached, the processor 320 continues (block 630) to determine whether attestation of performance of the driver requisite #1 has been received.

Figure 7:
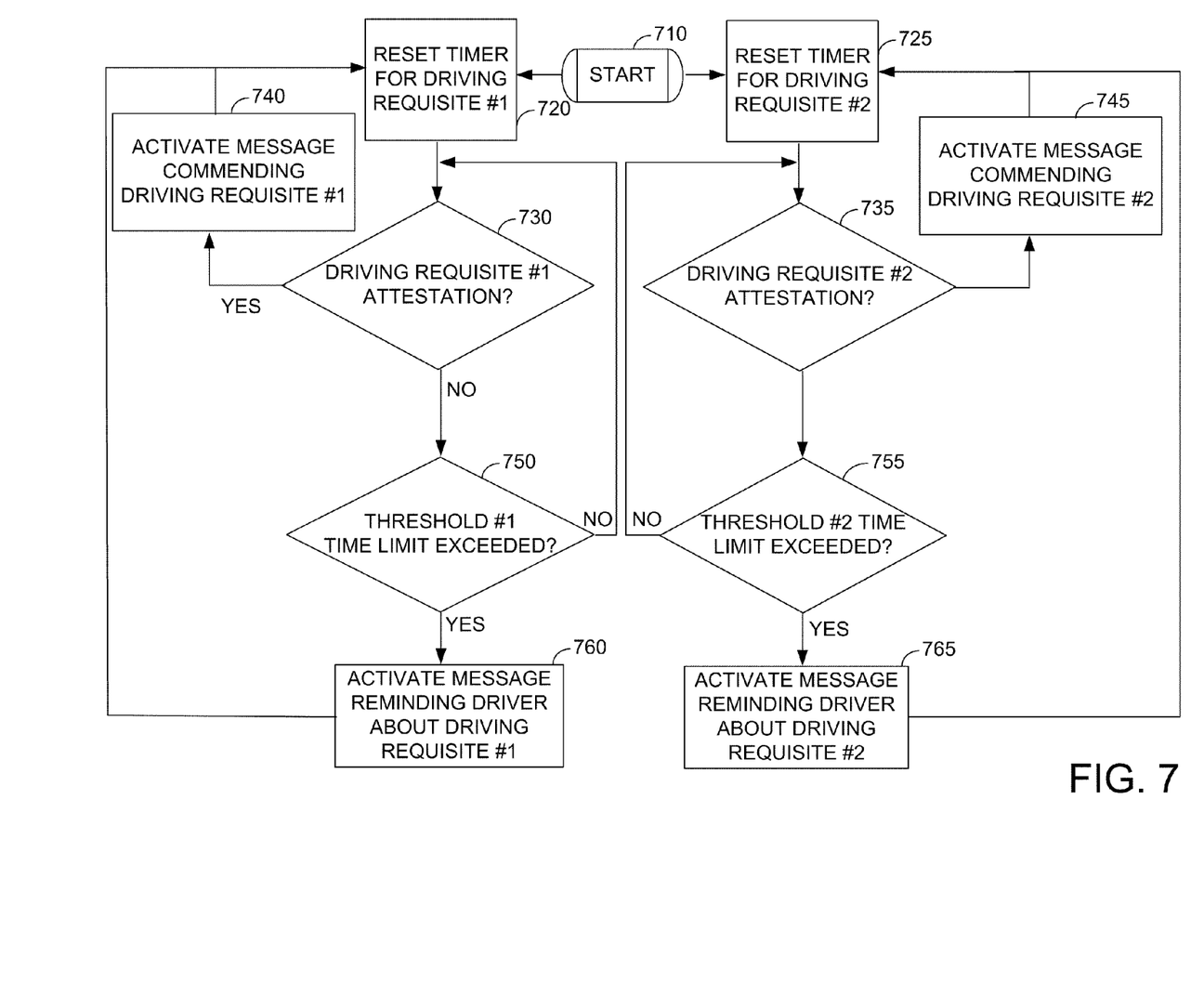

In FIG. 7, a flow chart is shown describing functionality of one embodiment of a vehicle assistive system 100, where a plurality of driving requisites or objectives are used in operation of the vehicle assistive system 100. Referring to the figure, after initial startup (block 710), a first timer or counter for a driving requisite #1 is set or reset (block 720) by a processor 320 and a second timer or counter for a driving requisite #2 is set or reset (block 725) by the processor 320. The timer counts an amount of time that has expired since the timer was reset. The processor 320 determines (block 730 and/or block 735) whether attestation of performance of a respective driver requisite (e.g., checking speed of vehicle, checking space management, etc.) has been received. When the attestation is received, the processor 320 activates (block 740 and/or block 745) a message (e.g., an audible message) commending the driver of a vehicle for performing the respective driving requisite. The processor 320 then resets (block 720 and/or block 725) the respective timer corresponding to the respective driving requisite.

When the attestation has not been received, the processor 320 determines (block 750) whether a threshold value for the driving requisite has been reached by the timer. When the threshold is reached for a respective driving requisite, the processor 320 activates (block 760 and/or block 765) a message (e.g., an audible message) reminding the driver to perform the respective driving requisite. Otherwise, if a respective threshold is not reached, the processor 320 continues (block 730 and/or block 735) to determine whether attestation of performance of the respective driver requisite has been received.

The flow charts of FIGS. 5-7 show the functionalities and operations of possible implementations of the vehicle assistive logic 375 of FIG. 3. In this regard, each block represents a module, segment, or portion of code, which comprises one or more executable instructions for implementing the specified logical function(s). It should also be noted that in some alternative implementations, the functions noted in the blocks may occur out of the order noted in FIGS. 5-7. For example, two blocks shown in succession in FIGS. 5-7 may in fact be executed substantially concurrently or the blocks may sometimes be executed in the reverse order, depending upon the functionality involved, as would be understood by those reasonably skilled in the art of the present disclosure.

Some embodiments of the vehicle assistive systems and methods help to maintain a driver's focus on the task of driving and also help to recover the driver's loss of concentration from the task of driving. Via interface controls, a driver is actively engaged and focused on thinking about the tasks of driving which is important to good driving habits. If a driver was to get distracted, e.g., receiving a cell phone call, the reminders presented by the vehicle assistive systems help the driver to refocus and bring the driver back on track of practicing good driving habits, while instilling confidence in the driver. Also, while many people do not have formal driving training, embodiments of the vehicle assistive systems and methods can supplement and help instill good driving habits. Further, one may update the audible messages and corresponding software used by a vehicle assistive system to address new driving tasks or other skills which build upon lessons learned with earlier audible cues/software/training sessions.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the present disclosure. All such modifications and variations are intended to be included herein within the scope of this disclosure and protected by the following claims.

Therefore, having thus described embodiments of the invention, at least the following is claimed:

1. A method of assisting a driver of a vehicle:
   receiving a command from the driver attesting that the driver has performed one of a plurality of driving requisites;
   in response to receipt of the command, presenting an audible cue commending the driver for performing one of the plurality of driving requisites;
   tracking an amount of time that elapses before the command attesting to performance of a respective driving requisite is received; and
   in response to the amount of time exceeding a threshold for the respective driving requisite, presenting an audible cue intending to remind the driver about the respective driving requisite being tracked that has exceeded the respective threshold.

2. The method of claim 1, wherein the plurality of driving requisites comprises checking vehicle speed.

3. The method of claim 1, wherein the plurality of driving requisites comprises checking vehicle mirrors.

4. The method of claim 1, wherein the plurality of driving requisites comprises checking vehicle spacing with respect to other vehicles.

5. The method of claim 1, wherein the command is generated using an input pad positioned on a console of the vehicle.

6. The method of claim 1, wherein the command is generated via a voice recognition interface.

7. A computer readable medium having a program for assisting a driver of a vehicle, the program when executed by a processor causing the processor to:
    detect receipt of a command from the driver attesting that the driver has performed one of a plurality of driving requisites;
    in response to receipt of the command, present an audible cue commending the driver for performing one of the plurality of driving requisites;
    track an amount of time that elapses before the command attesting to performance of a respective driving requisite is received; and
    in response to the amount of time exceeding a threshold for the respective driving requisite, present an audible cue intending to remind the driver about the respective driving requisite being tracked that has exceeded the respective threshold.

8. The computer readable medium of claim 7, wherein the plurality of driving requisites comprises checking vehicle speed.

9. The computer readable medium of claim 7, wherein the plurality of driving requisites comprises checking vehicle mirrors.

10. The computer readable medium of claim 7, wherein the plurality of driving requisites comprises checking vehicle spacing with respect to other vehicles.

11. The computer readable medium of claim 7, wherein the command is generated via an input pad positioned on a console of the vehicle.

12. A system of assisting a driver of a vehicle comprising:
    a microprocessor configured to:
        receive a command from the driver attesting that the driver has performed one of a plurality of driving requisites;
        in response to receipt of the command, present an audible cue commending the driver for performing one of the plurality of driving requisites;
        track an amount of time that elapses before the command attesting to performance of a respective driving requisite is received; and
        in response to the amount of time exceeding a threshold for the respective driving requisite, present an audible cue intending to remind the driver about the respective driving requisite being tracked that has exceeded the respective threshold; and
    a memory storage device for storing one or more of the audible cues for the driver.

13. The system of claim 12, further comprising:
    an input pad to signal to the microprocessor attestation of performance of one of the driving requisites.

14. The system of claim 13, wherein the input pad comprises a plurality of buttons, each of the plurality of buttons being directed to a particular driving requisite.

15. The system of claim 13, wherein the input pad is positioned on a console of the vehicle.

16. The system of claim 13, wherein the input pad is positioned on a steering wheel of the vehicle.

17. The system of claim 12, further comprising a port for receiving the memory storage device, wherein the audible cues being presented for the driver are able to be changed by inserting a different memory storage device into the port, the memory storage device storing different audible cues.

18. The system of claim 12, further comprising:
    a speaker assembly to present the audible cues.

19. The system of claim 13, further comprising:
    a speaker assembly to present the audible cues.

20. The system of claim 19, wherein microprocessor, input pad, and speaker assembly are integrated in a single unit structure.

* * * * *